United States Patent
Phung et al.

(10) Patent No.: US 9,793,939 B2
(45) Date of Patent: Oct. 17, 2017

(54) AUTOMATIC SELF-PROTECTION FOR A PORTABLE ELECTRONIC DEVICE

(71) Applicant: International Business Machines Corporation, Armonk, NY (US)

(72) Inventors: Maggie Phung, Round Rock, TX (US); Eric J. Rozner, Austin, TX (US); Chin Ngai Sze, Austin, TX (US); Zhennan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/818,743

(22) Filed: Aug. 5, 2015

(65) Prior Publication Data

US 2017/0041036 A1    Feb. 9, 2017

(51) Int. Cl.
*H04B 17/00*    (2015.01)
*H04B 1/3888*    (2015.01)
(Continued)

(52) U.S. Cl.
CPC ......... *H04B 1/3888* (2013.01); *H04B 17/104* (2015.01); *H04B 17/18* (2015.01); *H04W 88/02* (2013.01)

(58) Field of Classification Search
CPC .......... G08B 21/20; G08B 21/18; G06F 21/00
See application file for complete search history.

(56) References Cited

U.S. PATENT DOCUMENTS 6,496,949 B1   12/2002  Kanevsky et al.
8,779,947 B2    7/2014  Tengler et al.
(Continued)

FOREIGN PATENT DOCUMENTS

CN    103402003 A    11/2013

OTHER PUBLICATIONS

"Rain Sensor, Anderson Electric Window Opener," downloaded from Internet at <http://www.allaboutdoors.com/product_info.php-?products_id=1522010> on Aug. 3, 2015.
(Continued)

*Primary Examiner* — Charles Appiah
*Assistant Examiner* — Randy Peaches
(74) *Attorney, Agent, or Firm* — Mercedes L. Hobson; Gregory K. Goshorn; Greg Goshorn, P.C.

(57) ABSTRACT

Provided are techniques for automatically protecting portable and wearable electronic devices from potential hazards by predicting when such hazards may occur. Techniques may include monitoring a plurality of sensors on the mobile computing device; receiving, on the mobile computing device, context data from a plurality of context-service applications; selecting a set of device-protection policies based upon an availability of the plurality of sensors and the plurality of context-service applications, wherein the set of device-protection policies are configured to determine a level of risk to the mobile computing device based on sensor data received from the plurality of sensors and the context data; applying the sensor data and the context data to the set of device-protection policies to generate the level of risk; and triggering a self-protection action if the level of risk exceeds a pre-determined threshold level of risk.

20 Claims, 5 Drawing Sheets

(51) Int. Cl.
    *H04B 17/10*     (2015.01)
    *H04W 88/02*     (2009.01)
    *H04B 17/18*     (2015.01)

(56) References Cited

U.S. PATENT DOCUMENTS

| | | | |
|---|---|---|---|
| 2009/0159408 A1 | 6/2009 | Sunder | |
| 2013/0027202 A1 | 1/2013 | Lai et al. | |
| 2013/0254880 A1* | 9/2013 | Alperovitch | H04L 63/1408 726/22 |
| 2014/0191873 A1* | 7/2014 | Kreiner | H04M 1/72569 340/604 |
| 2016/0005296 A1* | 1/2016 | Kil | G08B 21/20 340/604 |

OTHER PUBLICATIONS myturbobodies.com, "Auto closing rain sensing windows and sunroof on you MK5+ vw," downloaded from Internet at <http://www.myturbodiesel.com/wiki/auto-closing-rain-sensing-windows-and-sunroof-on-your-mk5-vw/> on Aug. 3, 2015.

\* cited by examiner

AUTOMATIC SELF-PROTECTION FOR A PORTABLE ELECTRONIC DEVICE

FIELD OF DISCLOSURE

The claimed subject matter relates generally to mobile devices and, more specifically, to techniques for preemptive protection of mobile devices from hazardous conditions and situations.

BACKGROUND OF THE INVENTION

Mobile telephones and other portable electronic devices are currently ubiquitous in society. Such devices have limited capabilities to protect themselves from environmental hazards and conditions that might cause the devices to malfunction, such as water immersion, high temperature and being dropped. With respect to water immersion, some devices may be either water resistant or enclosed in an aftermarket case that protects the device from such exposure. Typically, unprotected devices that are powered on when exposed to water may suffer an electrical short. On the other hand, devices that are powered off may have a higher probability of being recoverable.

Current protection schemes only protect a device after a dangerous condition has occurred. For example, a water detection circuit on a mobile telephone may initiate action once water infiltration has occurred, e.g., the phone has been dropped into a swimming pool. In a similar fashion, a high temperature sensor may protect the device only one the temperature has exceeded a safe operating temperature.

SUMMARY

Provided are techniques for automatically protecting portable and wearable electronic devices from potential hazards by predicting when such hazards may occur. These techniques include the detection of potentially hazardous conditions and situations and the initiation of procedures to mitigate any damage that might result. Techniques may include monitoring a plurality of sensors on the mobile computing device; receiving, on the mobile computing device, context data from a plurality of context-service applications; selecting a set of device-protection policies based upon an availability of the plurality of sensors and the plurality of context-service applications, wherein the set of device-protection policies are configured to determine a level of risk to the mobile computing device based on sensor data received from the plurality of sensors and the context data; applying the sensor data and the context data to the set of device-protection policies to generate the level of risk; and triggering a self-protection action if the level of risk exceeds a pre-determined threshold level of risk.

In addition, techniques are provided to infer from one or more sensors the possibility of damage, even though the data which the one or more sensors are not configured to gather are not directly related to the potential condition. For example, data from a microphone may be employed to infer that water damage is imminent. Rules and policies are established to implement the pre-emptive protection techniques. Further, machine learning enables rules and policies to be generated and implemented based upon known situations in which damage to a device has occurred.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following, detailed description of the disclosed embodiments is considered in conjunction with the following figures.

DETAILED DESCRIPTION

Figure 1:
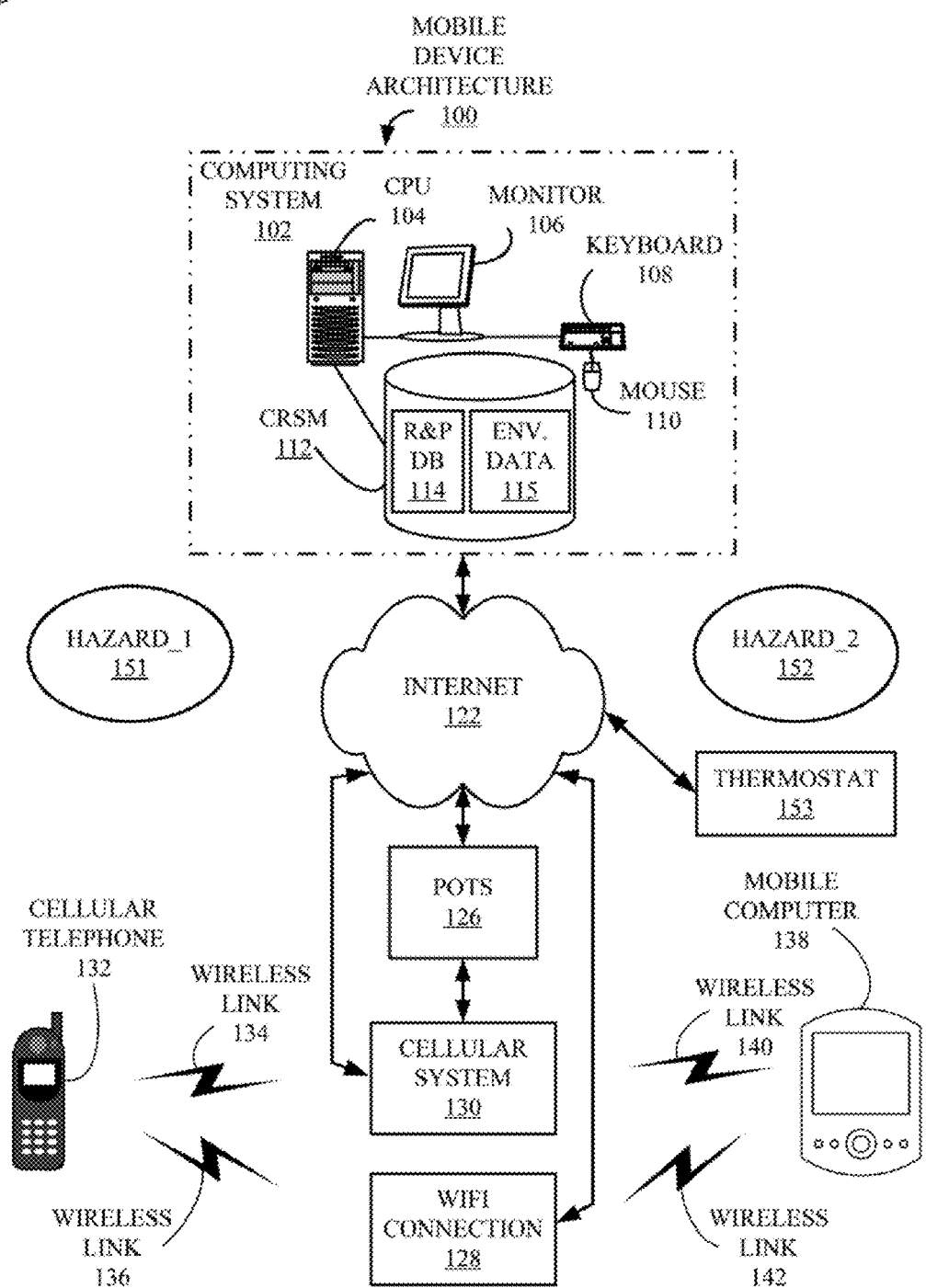
FIG. 1 is an example of a mobile device architecture in which the claimed subject matter may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's device, partly on the user's device, as a stand-alone software package, partly on the user's device and partly on a remote device. In the latter scenario, the remote computer may be connected to the user's device through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a device, other programmable data processing apparatus, or other devices to cause a series of operational actions to be performed on the computer, other programmable apparatus or other devices to produce a computer implemented process such that the instructions which execute on the device or other programmable apparatus provide processes for implementing the functions/acts specified in the flowchart and/or block diagram block or blocks.

FIG. 1 is an example of a mobile device architecture 100 in which the claimed subject matter may be implemented. A computing system 102 includes a central processing twit (CPU) 104 with one or more processors (not shown), coupled to a monitor 106, a keyboard 108 and a pointing device, or "mouse," 110, which together facilitate human interaction with elements of architecture 100 and computing system 102. Also included in computing system 102 and attached to CPU 104 is a non-transitive computer readable storage medium (CRSM) 112, which may either be incorporated into CPU 104 i.e. an internal device, or attached externally to CPU 104 by means of various, commonly available connection devices such as but not limited to, a universal serial bus (USB) port (not shown). CRSM 112 is illustrated storing a Rules and Policy database (R&P DB) 114 and environments (env.) data 115.

Rules and policies stored in R&P DB 114 may be provided by users and administrators or generated with machine learning (see 300, FIG. 5), Further, machine learning may be employed. For example, if a suitably configured mobile device fails, a label can be assigned to the particulars of the circumstances. A label is a description of the failure that occurred. Examples might be "water alert" (or water immersion) or "phone overheating". These can be manually defined by repair associates and administrators.

Rules and policies may be generated based upon detected patterns among a collections of circumstances to obtain training data. Circumstances are sets of sensor readings that are collected. It should be noted that that for machine learning many such sets of circumstances would likely need to collect, even ones that are not relevant to any particular failure that might occur. Machine learning may be accomplished in a variety of ways. Users or administrators may review the circumstances and manually assign a label, collect multiple sets of circumstances and eventually define rules or policies. Simply stated, machine learning typically works by analyzing many sets of circumstances, or "cases," and finding which "circumstances" are likely to predict a certain "label." The concept of machine learning should be familiar to those with skill in the relevant arts.

For instance, the process may begin in a retail establishment that sells devices configured in accordance with the claimed subject matter. When a customer brings in a broken phone for repair or replacement, a clerk at the retail establishment can inquire how the phone was damaged and this information may be used as the basis of labels, which are applied to the particular set of circumstances. Eventually new rules and policies may be defined based upon the information on how the phone was damaged.

Other examples include, but are not limited to, manually assigning a label to the events from another device (or the cloud), or using sensor data that was triggered after the phone failed. Example of the later is when a phone is dropped in the water, the phone may not be able to log that the water sensor was triggered because it failed too quickly. However, a microphone may be able detect the sound of water. In this case a "water alert" label may be assigned to a particular type of sound that has been logged. Thus, one could manually add this into the relevant dataset after the phone was recovered enabling future situations to be identified and appropriate action taken.

As explained in more detail below, R&P DB 114 and env. data 115 are merely two examples of information may be generated and employed to implement aspects of the claimed subject matter. It should also be understood that such data may be stored on a device, in a cloud storage system, a server such as computing system 102 and so on.

Computing system 102 is communicatively coupled to the Internet 122, which is also coupled to a typical telephone switch (POTS) 126 and a wireless, or WiFi, connection 128. A cellular system 130 is coupled to POTS 126 and Internet 122. In this example, two mobile communication/computing devices, i.e. a cellular telephone 132 and a mobile computer 138, are both able to communicate with cellular system 128 and WiFi connection 130. Although not illustrated in FIG. 1, both cellular telephone 132 and mobile computer 138 incorporate both a number of sensors and a contextual engine (CE) (see 160, FIG. 2) that implements aspects of the claimed subject matter. Types of sensors that may be included on devices 132 and 138, include, but are not limited to, motion sensors, environmental sensors and position sensors. It should be understood that other types of sensors and devices other than telephones and computers may be employed in conjunction with and benefit from the claimed subject matter. Any mobile and wearable electronic device may incorporate the disclosed technology to guard against potential damage.

Wireless link 134 represents a communication link between cellular telephone 132 and cellular system 130. Wireless link 136 represents a communication link between cellular telephone 132 and WiFi connection 128. Cellular telephone 132 may simultaneously communicate over links 134 and 136 or "roam" between links 134 and 136, as well as other possible communication links, which for the sake of simplicity are not shown. Telephone 132 may select the link 134 or 136 based either upon such parameters as the strength of the connection, the type of communication or the relative costs of connections 134 and 136.

Wireless link 140 represents a communication link between mobile computer 138 and cellular system 139. Wireless link 142 represents a communication link between mobile computer 138 and cellular system 128. Like cellular telephone 132 and links 134 and 136, mobile computer may simultaneously communicate over links 140 and 142 or "roam" between links 140 and 142, as well as other possible communication links, which for the sake of simplicity are not shown.

Also illustrated in FIG. 1 are two (2) examples of hazards, or a combination of conditions that may harm a device i.e., a hazard_1 151 and a hazard_2 152. Hazards 151 and 152 are used throughout the Specification as examples of potential environments or conditions that might present a problem for a mobile computing device such as cellular telephone 132 or mobile computer 138. One example of a potential hazard is a swimming pool, river or other body of water. An example of a condition that might be hazardous to a mobile computing device is a high-temperature situation. It should be understood that water and high temperature are only examples of many situation in which a mobile computing device might experience difficult or be subject to damage. The claimed subject matter is meant to address the protection of devices from such conditions, both those known and yet to be experienced, not only be detecting the actual situation but also by inferring the possibility that a particular situation might occur based upon data from sensors that are not typically designed to detect the particular situation.

Also illustrated in FIG. 1, is a thermostat 153. Thermostat 153 is uses as an example of both an external sensor that may be monitored and an external device that may be controlled in accordance with the claimed subject matter. For example, thermostat 153 may be installed in an automobile or garage and provide an indication that a high temperature condition is occurring. In such a case, thermostat 153 may then be remotely adjusted to adjust the temperature of the automobile or garage.

Figure 2:
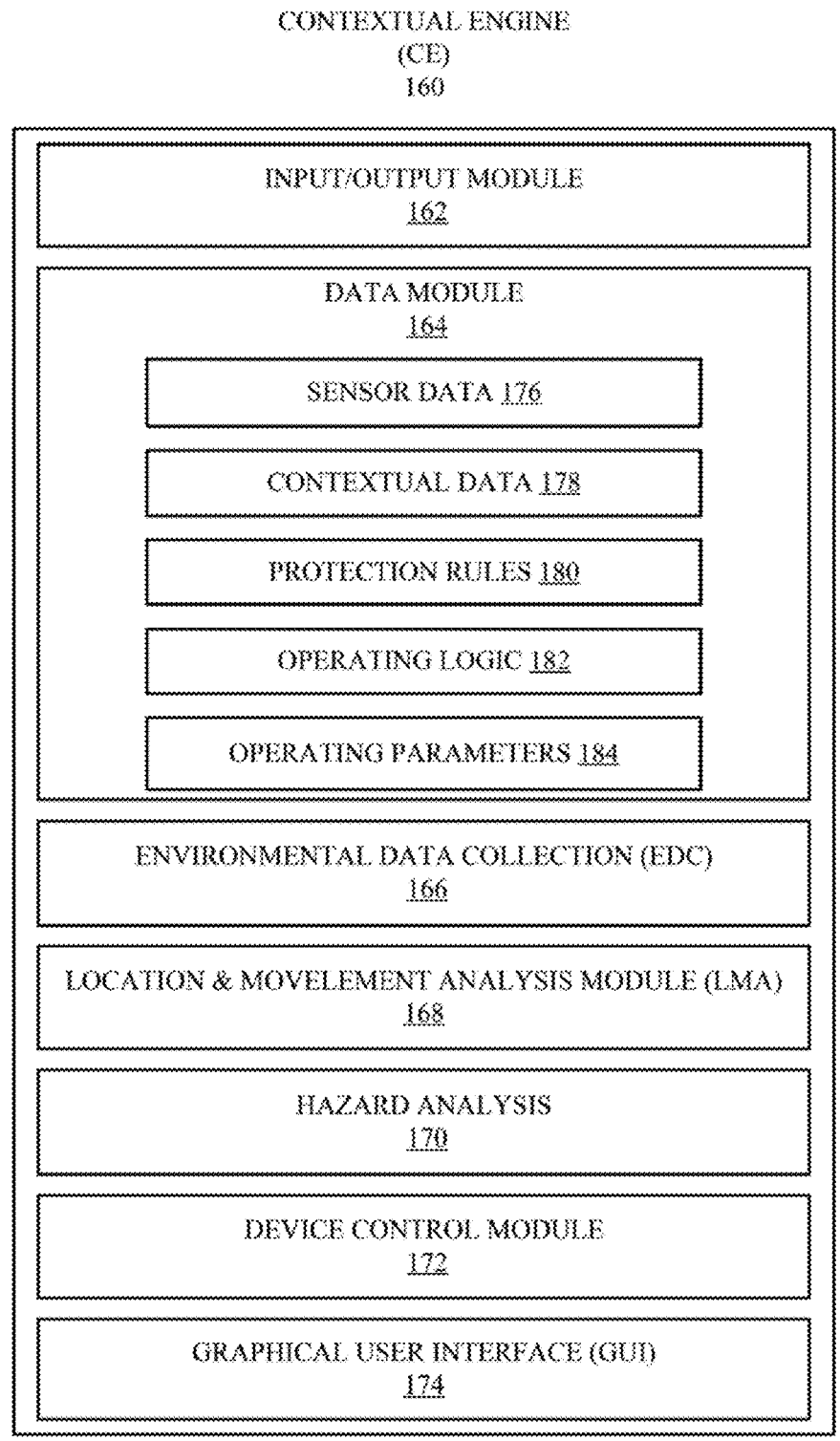
FIG. 2 is a Contextual Engine that may implement aspects of the claimed subject matter.

FIG. 2 is a Contextual Engine (CE) 160 that may implement aspects of the claimed subject matter. In this example, logic associated with CE 160 is installed on cellular telephone 132 (FIG. 1) although CE 160 is equally applicable and may be installed onto any mobile or stationary computing device to detect and initiate protective measures in response to a hazardous situation. Logic associated with CE 160 may include hardware, software or some combination of the two. Software associated with CE 160 may be stored in a CRSM (not shown) and executed on one or more processors (not shown) of cellular telephone 132. The logic may be executed as a daemon on an operating system (OS) of cellular telephone 312, on a dedicated co-processor or on a separate device with a communication link to cellular telephone 132 such as computing system 102. Further, the logic may also be stored on the cloud and sensors may come from external devices such as, but not limited to, a watch or an automobile. Sensors can coordinate with CE 160 locally, or via the cloud. It should be understood that the claimed subject matter can be implemented in many types of computing systems, devices and data storage structures but, for the sake of simplicity, is described only in terms of cellular telephone 132 and mobile device architecture 100 (FIG. 1). For example, some aspects of functionality attributed to CE 160 may be performed on other computing resources and computing systems such as cloud computing or services communicating over the Internet or other communication mediums.

CE 160 includes an input/output (I/O) module 162, a data module 164, an environmental data collection (EDC) module 166, a location and movement analysis (LMA) module 168, a hazard analysis module 170, a device control module 172 and a graphical user interface (GUI) module 174. It should be understood that, the representation of CE 160 in FIG. 2 is a logical model. In other words, logic associated with components 162, 164, 166, 168, 170, 172 and 174 may be stored incorporated into the same or separates files or circuits and loaded and/or executed within cellular telephone 132 either as a single system or as separate processes interacting via any available inter process communication (IPC) techniques.

In addition, it should be understood that data (see 114 and 115, FIG. 1) and processing associated with CE 160 may be stored and performed on off-devices storage media such as the cloud (not shown) and processors not shown. A mobile computing device, such as in this example cellular telephone 132, can continuously monitor sensor readings and log the sensor data. Data can be logged on cellular telephone 132 or on an external storage medium, such as the cloud. Data need not be saved in raw format, as the data may be summarized, compressed or filtered. Data may be periodically sent to an external storage medium (not shown) to prevent the loss of data if cellular telephone 132 thus, in addition, data can be offloaded based on context, e.g., when more dangerous situations arise, data is be offloaded more frequently. The same policy engine (see 170) that determines if self-protecting features are necessary may also be employed here, in which case the thresholds or contexts needed to engage the data offload should be easier to invoke than the set of thresholds or contexts that engage self-protecting features.

I/O module 162 handles any communication CE 160 has with other components of cellular telephone 132 and architecture 100. Data module 164 is a data repository for information that CE 160 requires during normal operation. Examples of the types of information stored in data module 164 include sensor data 176, contextual data 178, protection rules 180, operating logic 182 and operating parameters data 184.

Sensor data 176 stores information on any environmental sensors that may be incorporated into cellular telephone 132. Examples of such sensors may include, but are not limited to, motion sensors, environmental sensors, position sensors, a gyroscope, global positioning system (GPS), accelerometer, temperature gauge, water sensor, microphone, camera, capacitive screen touch logging and so on.

Contextual data 178 stores context-based data such as, but no limited to, location data, activities being performed, calendar entries, social media posts and so on. Such data may be pulled from context-service applications running on the mobile phone, remote context-service applications such as a cloud-based service, analyzed from social media posts, or using API's provided by an operating system (OS), e.g., Android provides a getMostProbableActivity( ) call. Further, data may be manually logged by a user. Users may add notes in the form of audio/video/text that can be converted to a common format. Contextual data 178 may also include data on known hazardous locations. For example, contextual data 178 may store the location of bodies of water such as swimming pools, lakes and even particular bathroom fixtures. Another example of a hazardous location may be the position of a known heat source. In addition, contextual data 178 may include application information, such as what applications are running on the phone and their current state information, and phone data, such as internal data specific the OS of cellular telephone 132, including but not limited to, processor usage, memory usage, whether cellular telephone 132 is turned on or off, whether the screen is on or off and so on.

Protection rules 180 stores information on particular conditions that may initiate the claimed protection techniques. As explained in more detail below, rules and policies may be generated and stored within a particular device, such as cellular telephone 132, or may be server or cloud based. Specific rules may be generated by methods such as, but not limited to, collecting historical data corresponding to a plurality of failures of a plurality of mobile computing devices and data mining the historical data to identify a particular source of failure of the plurality of failures; and crowd-sourcing scenarios of a plurality of failures on other mobile computing devices. In addition, protection rules 180 may include threshold values corresponding to levels of risk corresponding to particular policies that trigger the implementation of the particular policy.

One rule/policy may specify that a dropping movement in proximity to a known bathroom fixture triggers a power-off response. Another example may be a rule for initiating a mitigating action in response to the detection that a device is in freefall, i.e., the device has been dropped. A third example is a microphone detecting the sound of a washing machine and inferring the a potential water hazard is imminent. A fourth example may be a determination that cellular telephone 132 is outside and there are indications that it may be raining. Additional conditions might include, when a user is jogging. There are applications that can determine a person is jogging based upon various sensor readings, GPS can determine that a user is outside and weather applications can determine it is raining. Although there is prior art directed to protecting a phone that has been dropped, the disclosed technology adds an additional layer of flexibility and control. For example, a user may specify constraints and policies that turn of a mobile device only when the device is both falling and near a body of water. In addition, one sensor, e.g., a microphone, may be employed to detect an unrelated type of hazard, e.g., water damage as described in the example above.

Specific constraints and policies of protection rules 180 may be generated by a user or available for download, having been, for example, crowd sourced by other users or provided by a manufacturer. It should be understood that there are many potential dangerous situations for a mobile computing device and that water and dropping are merely two of many examples.

Suitably configured devices may not always fail in a dangerous condition. If a dangerous condition has been detected and a corresponding sensor was activated, then that can be used as a label. There exist techniques for detecting that a phone/laptop is being dropped and that then save data to disk, for instance. When these technologies are activated, the data may be used for our training labels and ultimately for the basis of a rule or policy In a cloud-implemented embodiment, training data and labels may be aggregated and analyzed to understand when dangerous conditions may arise, which may rely on well-known machine learning techniques to discover specific mappings. At a high-level, algorithms may determine which sensor, contextual, application or phone data are highly correlated with, or can predict, the immediate onset of a dangerous activity. Learning algorithms may also collect additional data that is not provided in an initial dataset. For example, a GPS coordinate may be mapped to a body of water. The phone may not immediately know that a GPS coordinate corresponds to a body of water, but that could be inferred by combining data from other sources, such as the Internet. For example, Google Maps can tell you if a GPS coordinate is in a body of water or not. Another example could be a specific audiotary signature or image. There are many algorithms that can detect similarity between these sort of formats (SoundHound and Google Image Search are two examples). This can be used to determine a common element within a sensor reading that can be used as a trigger for a dangerous event about to occur.

Corrective actions that can be taken may also be learned in a fashion similar to the manner in which labels, rules and policies are generated. Basically, "near-misses" can be used to help determine what should be done. A near-miss can be defined when some sensor reading indicates with a high accuracy that it was triggered (such as the prior art that detects a phone falling or water damage). The actions immediately taken after the near-misses can be pulled out from logged data. An example could be to turn off the phone. Note that logged data from multiple devices, not merely cellular telephone 132, can be included in these algorithms. For example, in an internet-of-things connected environment, data from a car, washing machine, watch, and other nearby devices can be uploaded to the cloud. The actions that occur around the time of the near miss can be pulled out and then learned.

Learning can be under the guidance of administrators and users. For example, rules and actions can manually be approved and assigned weights towards certain sensors. Actions can be manually refined. Users may also create a set of conditions that trigger certain protecting features to be engaged. The protecting features to be engaged in this case can either be manually created, or compared against the actions that have been suggested from centralized machine learning algorithms.

Operating logic 182 stores executable code that implements the claimed subject matter on cellular telephone 132. Operating parameters 184 stores user set variables that control the operation of CE 160. For example, variables may specify an ambient temperature that should not be exceeded or a rate of acceleration that should not be equaled, e.g., the rate at which a body in freefall accelerates. Other variables may specify potential external data sources and the look and feel of GUI 174.

Environmental data collection (EDC) 166 collects information from sensors (see 176) located on cellular telephone 132. Data may also be collected from external sources such as env. data 115 (FIG. 1). As explained above, such sensors may include, but are not limited to, temperature, moisture, movement, acceleration and position sensors. Location and movement analysis module (LMA) 168 calculates a current position and movement of cellular telephone 132. Such information may be gathered, for example, from sensors on cellular telephone 132 or from external sources such as a GPS module (not shown) or a cellular system such as cellular system 128 (FIG. 1).

Hazard analysis 170 calculates whether or not a hazardous condition or situation exists. Hazard analysis 170 would typically process information provided by EDC 166, LMA 168 and any external sources, evaluate such information with respect to protection rules 180 to determine whether or action needs to be initiated. If action is deemed necessary, operating logic 182 would initiates such action in conjunction with device control module 172. GUI 174 enables users of CE 160 to interact with and to define the desired functionality of CE 160, typically by setting variable in operating parameters 184. Elements 162, 164, 166, 168, 170, 172, 174, 176, 178, 180, 182 and 1846 are described in more detail below in conjunction with FIGS. 3-4.

Figure 3:
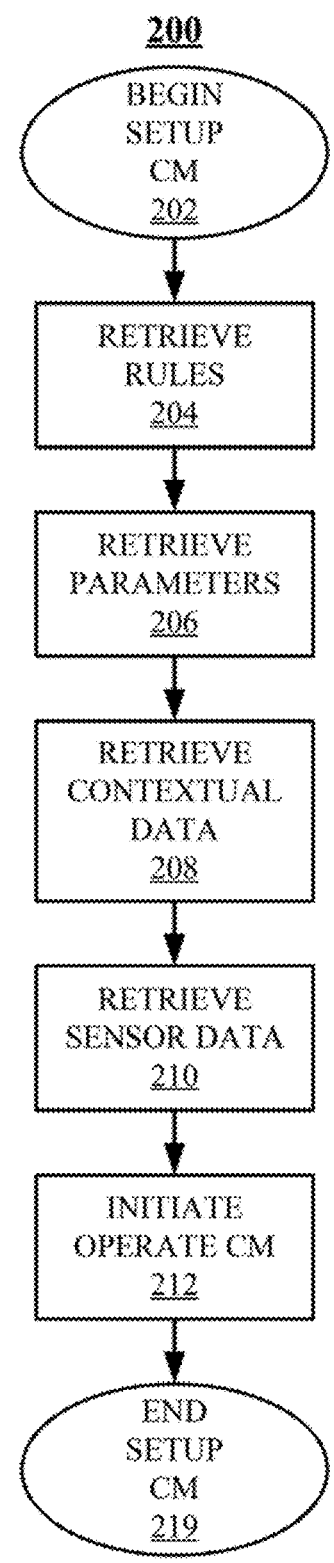
FIG. 3 is a flowchart of one example of a Setup Contextual Monitoring process that may implement aspects of the claimed subject matter.

FIG. 3 is a flowchart of one example of a Setup Contextual Monitoring process 200 that may implement aspects of the claimed subject matter. In this example, logic associated with process 200 is stored in conjunction with CE 160 (FIG. 2) (see 182, FIG. 2) and executed on one or more processors of cellular telephone 132 (FIG. 1). As explained above in conjunction with FIG. 2, logic associated with process 200 may be also be stored and executed on a dedicated co-processor of cellular telephone 132 or on a separate device with a communication link to cellular telephone 132 such as computing system 102.

Process 200 starts in a "Begin Setup Contextual Engine (CE)" block 202 and proceeds immediately to a "Retrieve Rules" block 204. During processing associated with block 204, pre-defined constraints and policies (see 180, FIG. 2) are retrieved and loaded into process 200. As explained above, such constraints and policies may be generated by a user or available for download, having been, for example, crowd sourced by other users or provided by a manufacturer. During processing associated with a "Retrieve Parameters" block 206, any user defined parameters for controlling the operation of CE 160 (see 184, FIG. 2) are retrieved and loaded into process 200. During processing associated with a "Retrieve Contextual Data" block 208, any relevant data relating to known hazards (see 178, FIG. 2) is retrieved and loaded into process 200. Contextual data may be retrieved from remote sources such as a cloud-based service or from application executing on mobile telephone 132. During processing associated with a "Retrieve Sensor Data" block 210, any relevant data relating to sensors that may be used to implement the claimed subject matter (see 176, FIG. 2) is retrieved and loaded into process 200. As explained above, sensors may be either on cellular telephone 132 or located elsewhere. In addition, possible sensors may include moisture, temperature, acceleration sensors and so on.

Once data has been retrieved and loaded during processing associated with blocks 204, 206, 208 and 210, control proceeds to an "Initiate Operate CM" block 212. During processing associated with block 212, an Operate CM process 250 (see FIG. 4) is spawned. To bootstrap the system, some at-risk scenarios may be invoked, or simply a predefined set of policies/rules may be manually entered. Finally, control proceeds to an "End Setup CM" block 219 in which process 200 is complete.

Figure 4:
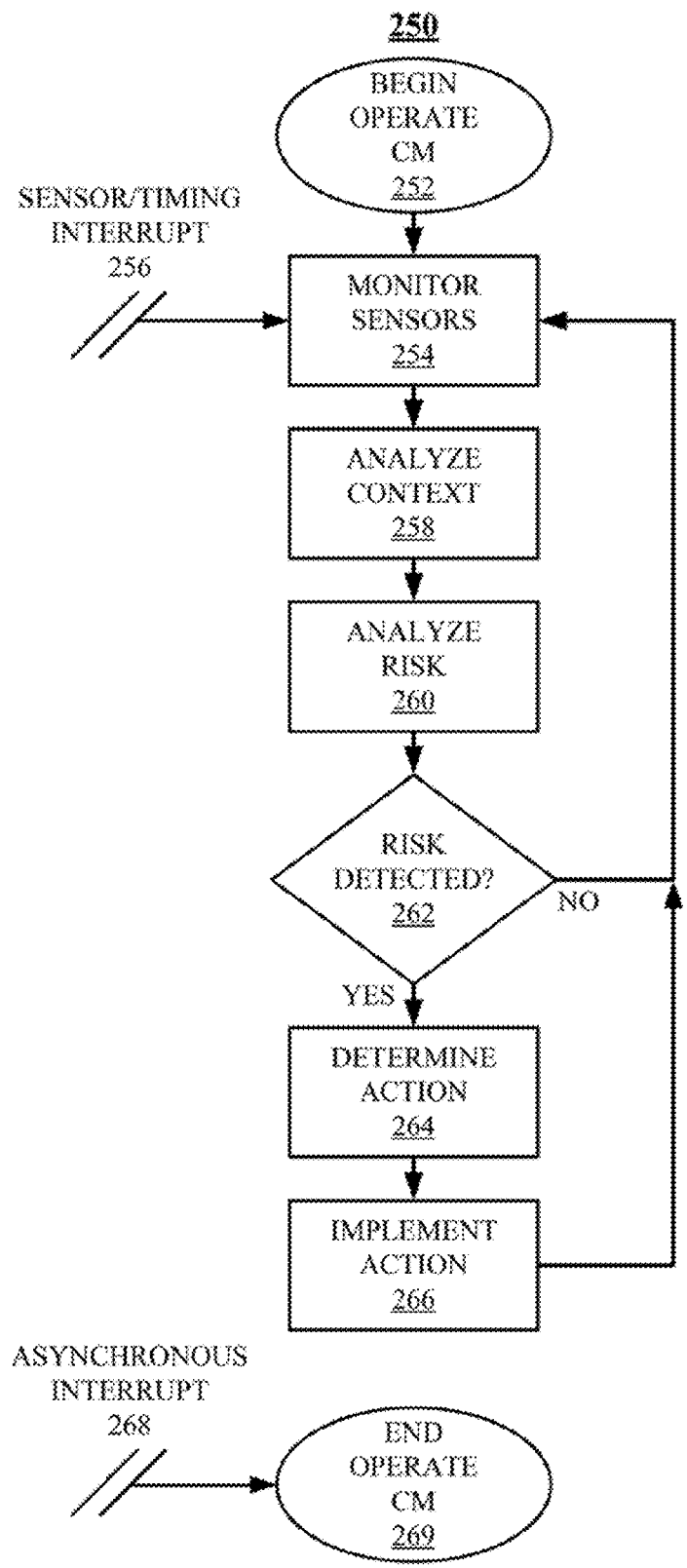
FIG. 4 is a flowchart of one example of an Operate Contextual Monitoring process that may implement aspects of the claimed subject matter.

FIG. 4 is a flowchart of one example of an Operate Contextual Monitoring (CM) process 250 that may implement aspects of the claimed subject matter. Like process 200, in this example, logic associated with process 250 is stored in conjunction with CE 160 (FIG. 2) (see 182, FIG. 2) and executed on one or more processors of cellular telephone 132 (FIG. 1.). As explained above in conjunction with FIGS. 2 and 3, logic associated with process 250 may be also be stored and executed on a dedicated co-processor of cellular telephone 132 or on a separate device with a communication link to cellular telephone 132 such as computing system 102.

Process 250 starts in a "Begin Operate Contextual Engine (CE)" block 252 and proceeds immediately to a "Monitor Sensors" block 254. During processing associated with block 254, any sensors configured to support the claimed subject matter are monitored. As explained above in conjunction with FIG. 2, sensors may be either located on the device being protected, in this example cellular telephone 132 or on external devices such as a watch or automobile. A sensor/timing interrupt 256 signals when a sensor reading is available. Interrupt 256 may also be generated at periodic intervals to signal process 250 to poll sensors. In other words, sensors may report data periodically, i.e., "push," or report only when queried, "pull," or some combination or the two. In addition, sensors may be programmed to report when a particular condition exists, e.g., high temperature. It should be understood that may different types of sensors may be employed. For example, a microphone (not shown) on cellular telephone 132 may be used to determine that telephone 132 is in a washing machine or thunder storm. A camera on cellular telephone 132 may be employed to conditions that might be dangerous to the device. Accelerometer/gyroscope (not shown) may be used to infer a dangerous condition either by themselves or in conjunction with other sensors. For example, CE 160 may be more sensitive to the sound of a thunder storm if another sensor infers that the user is jogging or fly fishing.

Once sensors have been monitored during processing associated with block 254, control proceeds to an "Analyze Context" block 258. During processing associated with block 258, the context of cellular telephone 132 is ascertained. One example of such data is the location of telephone 132, which may be collected based upon any number of typically available methods such as GPS or signal triangulation. During processing associated with an "Analyze Risk" block 260, sensor data collected during processing associated with block 254 is correlated with context data generated during processing associated with block 256 to identify any potential hazards (see 168, FIG. 2).

During processing associated with a "Risk Detected?" block 262, a determination is made as to whether or not the analysis performed during processing associated with block 260 indicates a potential risk to cellular telephone 132. Such a determination would be made based upon a calculated level of risk compared to a threshold that represents and unacceptable level of risk. If the level of risk exceeds the threshold, a actual risk is detected and a risk is therefore detected. If the level of risk does not exceed the threshold, control returns to block 254 and processing continues as describe above. If a risk is detected, control proceeds to a "Determine Action" block 264. During processing associated with block 264, an appropriate action to mitigate the risk identified during processing associated with block 262 is formulated. Such action may include controlling the device, e.g., powering the device off, or initiating action external to the device. For example, if process 250 determines that the hazard is high temperature and the location is an automobile, appropriate action may include sending a message to a user that the condition is occurring or turning on the air conditioning in the automobile. Further, in the example of high temperature, thermo-couples on the affected device or on a case of the affected device may be activated. In the case of a microphone detecting that cellular telephone is in a washing machine, an appropriate action may be to turn off and drain the washing machine. If CE 160 infers that the user is jogging, cellular telephone 132 may be shut down as a preventative measure. One action may be to simply inform the user that a particular condition has occurred so that external conditions may be controlled, for example, via an application on cellular telephone 132. Typically, such responses would be defined within rules 180 (FIG. 2) and operating parameters 184 (FIG. 2).

During processing associated with an "Implement Action" block 266, the action formulated during processing associated with block 264 is initiated. As explained above, such action may include controlling the device, external devices or some combination. Once action has been initiated during processing associated with block 266, control returns to block 254 and processing continues as described above.

Finally, process 250 is halted by means of an asynchronous interrupt 268, which passes control to an "End Operate CM" block 269 in which process 250 is complete. Interrupt 269 is typically generated when the device, OS, application, etc. of which process 250 is a part is itself halted. During normal operation, process 250 continuously loops through the blocks 254, 258, 260, 262, 264 and 266, processing sensor data as it is received.

Figure 5:
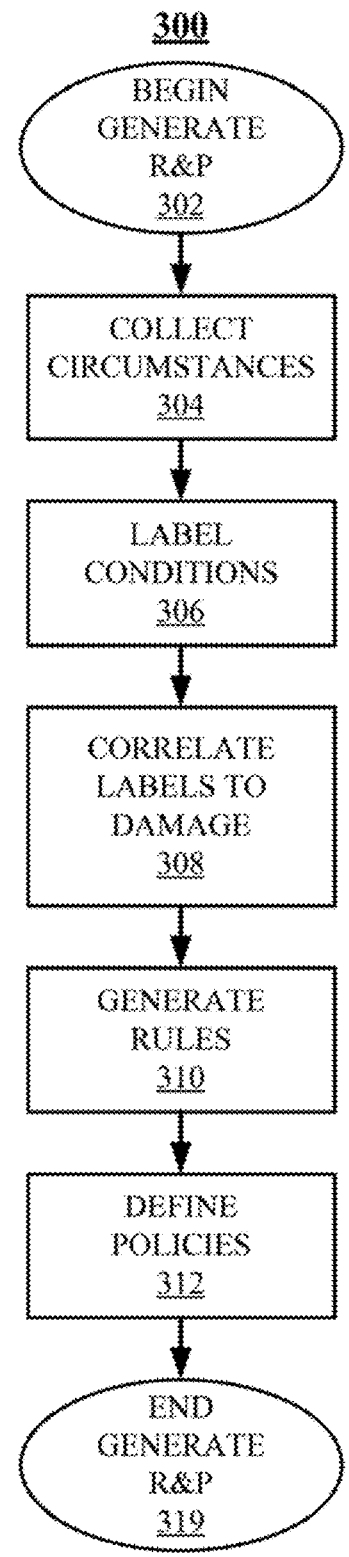
FIG. 5 is an example of a Generate Rules and Policies process that may implement aspects of the claimed subject matter.

FIG. 5 is an example of a Generate Rules and Policies (R&P) process 300 that may implement aspects of the claimed subject matter. As explained above in conjunction with FIG. 1, that disclosed techniques may be based upon pre-defined rules and policies (see 214, FIG. 1) and such rules and policies may be provided by users and administrators or generated with machine learning. For example, rules may be based upon data mining historical data from previous failures of mobile computing devices or crowdsource data from users of mobile computing devices. In this example, process 300 is associated with logic stored on CRSM 112 (FIG. 1) and executed on one or more processors (not shown) of CPU 104 (FIG. 1) of computing system 102.

Process 300 starts in a "Begin Generate Rules and Policies (R&P)" block 302 and proceeds immediately to a "Collect Circumstances" block 304. During processing associated with block 304, data relating to situations that have caused devices to fail are collected. As explained above, such scenarios may be collected from, for example, users, administrators and clerks at a retail establishment at which a damaged device is presented for repair or replacement. During processing associated with a "Label Conditions" block 306, each particular circumstance associated with the scenarios collected during processing associated with block 304 are labeled. For example, a particular type of sound from a microphone may be labeled as "potential water damage" based upon actual water damage that occurred following the sound. Such labeling normalizes the data so that the data from different circumstances, or "scenarios," may be mined for patterns during processing associated with a "Correlate Labels to Damage" block 308.

Once patterns of situations to damage have been established during processing associated with block 308, rules corresponding to those patterns are generated during processing associated with a "Generate Rules" block 310. during processing associated with a "Define Policies" block 312, specific policies are defined for the rules generated during processing associated with block 310. Examples of policies include, but are not limited to, turning an affected device off or exerting control over one device (see 153, FIG. 1) to mitigate damage to another device. Finally, during processing associated with an "End Generate G&P" block 319, process 300 is complete. The generated data would then be stored fix use in future processing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for protecting a mobile device, comprising:
monitoring a plurality of sensors on the mobile computing device;
receiving, on the mobile computing device, context data from a plurality of context-service applications;
selecting a set of device-protection policies based upon an availability of the plurality of sensors and the plurality of context-service applications, wherein the set of device-protection policies are configured to determine a level of risk to the mobile computing device based on sensor data received from the plurality of sensors and the context data, wherein the context data is used as a factor in determining a potential hazard to the mobile computing device prior to an actual hazard corresponding to the potential hazard being detected by a sensor of the plurality of sensors;

applying the sensor data and the context data to the set of device-protection policies to generate the level of risk; and triggering a self-protection action if the level of risk exceeds a pre-determined threshold level of risk.

2. The method of claim 1, wherein the plurality of sensors are selected from a list, the list consisting of:
 a plurality of motion sensors;
 a plurality of environmental sensors; and
 a plurality of position sensors.

3. The method of claim 1, wherein at least one of the plurality of context-service applications is a cloud-based service.

4. The method of claim 1, wherein at least one of plurality of context-service applications is an application executing on the mobile computing device.

5. The method of claim 1, wherein the self-protection action comprises controlling the mobile computing device.

6. The method of claim 5, wherein the controlling the mobile computing device comprises powering off the mobile computing device.

7. The method of claim 1, wherein the self-protection action comprises controlling a device other than the mobile computing device.

8. The method of claim 1, wherein the self-protection policies are generated by a method, the method comprising:
 collecting historical data corresponding to a plurality of failures of a plurality of mobile computing devices; and
 data mining the historical data to identify a particular source of failure of the plurality of failures.

9. The method of claim 1, wherein the self-protection policies are based upon crowd-sourced scenarios of a plurality of failures on other mobile computing devices.

10. A mobile computing device, comprising:
 a plurality of processors;
 a non-transitory computer-readable recording medium coupled to the plurality of processors;
 a plurality of sensors; and
 logic, stored on the computer-readable recording medium and executed on the plurality of processors, to perform a method the method comprising:
  monitoring the plurality of sensors;
  receiving, on the mobile computing device, context data from a plurality of context-service applications;
  selecting a set of device-protection policies based upon an availability of the plurality of sensors and the plurality of context-service applications, wherein the set of device-protection policies are configured to determine a level of risk to the mobile computing device based on sensor data received from the plurality of sensors and the context data, wherein the context data is used as a factor in determining a potential hazard to the mobile computing device prior to an actual hazard corresponding to the potential hazard being detected by a sensor of the plurality of sensors;
  applying the sensor data and the context data to the set of device protection policies to generate the level of risk; and
  triggering a self-protection action if the level of risk exceeds a pre-determined threshold level of risk.

11. The mobile computing device of claim 10, wherein the plurality of sensors are selected from a list, the list consisting of:
 a plurality of motion sensors;
 plurality of environmental sensors; and
 a plurality of position sensors.

12. The mobile computing device of claim 10, wherein at least one of the plurality of context-service applications is a cloud-based service.

13. The mobile computing device of claim 10, wherein at least one of plurality of context-service applications is an application executing on the mobile computing device.

14. The mobile computing device of claim 10, wherein the self-protection policies are generated by a method, the method comprising:
 collecting historical data corresponding to a plurality of failures of a plurality of mobile computing devices; and
 data mining the historical data to identify a particular source of failure of the plurality of failures.

15. The mobile computing device of claim 10, wherein the self-protection policies are based upon crowd-sourced scenarios of a plurality of failures on other mobile computing devices.

16. A computer programming product for protecting a mobile computing device comprising a non-transitory computer-readable storage medium having program code embodied therewith, the program code executable by a plurality of processors to perform a method comprising, comprising:
 monitoring a plurality of sensors the mobile computing device;
 receiving, on the mobile computing device, context data from a plurality of context-service applications;
 selecting a set of device-protection policies based upon an availability of the plurality of sensors and the plurality of context-service applications, wherein the set of device-protection policies are configured to determine a level of risk to the mobile computing device based on sensor data received from the plurality of sensors and the context data, wherein the context data is used as a factor in determining a potential hazard to the mobile computing device prior to an actual hazard corresponding to the potential hazard being detected by a sensor of the plurality of sensors;
 applying the sensor data and the context data to the set of device-protection policies to generate the level of risk; and
 triggering a self-protection action if the level of risk exceeds a pre-determined threshold level of risk.

17. The computer programming product of claim 16, wherein the plurality of sensors are selected from a list, the list consisting of:
 a plurality of motion sensors;
 a plurality of environmental sensors; and
 a plurality of position sensors.

18. The computer programming product of claim 16, wherein the self-protection action comprises controlling the mobile computing device.

19. The computer programming product of claim 16, wherein the self-protection policies are generated by a method, the method comprising:
 collecting historical data corresponding to a plurality of failures of a plurality of mobile computing devices; and
 data mining the historical data to identify a particular source of failure of the plurality of failures.

20. The computer programming product of claim 16, wherein the self-protection policies are based upon crowd-sourced scenarios of a plurality of failures on other mobile computing devices.

* * * * *